(12) United States Patent
Miller et al.

(10) Patent No.: US 10,278,053 B1
(45) Date of Patent: Apr. 30, 2019

(54) DYNAMIC MANAGEMENT OF INCIDENT AREA DEPLOYABLE COMMUNICATIONS SYSTEMS

(71) Applicant: MOTOROLA SOLUTIONS, INC., Chicago, IL (US)

(72) Inventors: Trent J. Miller, West Chicago, IL (US); Lee M. Proctor, Cary, IL (US); Bruce D. Mueller, Palatine, IL (US); David P. Gurney, Carpentersville, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/884,956

(22) Filed: Jan. 31, 2018

(51) Int. Cl.
*H04W 4/90* (2018.01)
*H04W 24/02* (2009.01)
(Continued)

(52) U.S. Cl.
CPC ............ *H04W 4/90* (2018.02); *G06F 9/4881* (2013.01); *H04B 17/336* (2015.01);
(Continued)

(58) Field of Classification Search
CPC . H04W 88/08; H04W 72/082; H04W 72/048; H04W 72/04; H04W 52/0206; H04W 76/10; H04W 16/04; H04W 28/0268; H04W 4/90; H04W 76/15; H04W 16/16; H04W 16/20; H04W 28/0231; H04W 28/0252; H04W 28/0289; H04W 28/06; H04W 28/08; H04W 28/12; H04W 4/025; H04W 24/02; H04W 84/10; H04W 84/12; H04W 4/80; H04W 88/06; H04W 76/14; H04W 84/005; H04W 84/18;
(Continued)

(56) References Cited

U.S. PATENT DOCUMENTS 8,588,852 B2 11/2013 Galaro et al.
8,958,835 B2 2/2015 Koorapaty et al.
(Continued)

FOREIGN PATENT DOCUMENTS

WO 2014040711 3/2014

*Primary Examiner* — Daniel Lai
(74) *Attorney, Agent, or Firm* — Michael Best & Friedrich LLP

(57) ABSTRACT

Devices and methods for dynamic management of incident area deployable communications systems. Deployable base stations implement an ad hoc peer-to-peer or master-slave methods of determining activation states and transmission characteristics of plurality of deployable base stations at an incident area. The methods include receiving incident scene information from the plurality of deployable base stations and determining a coverage region for providing wireless communications coverage to one or more mobile communication devices in the incident area. The methods further include determining the activation states of the plurality of deployable base stations and determining transmission characteristics of the plurality of deployable base stations based on the incident scene information and the coverage region. One or more of the deployable base stations are activated in accordance with the determined transmission characteristics.

20 Claims, 7 Drawing Sheets

(51) Int. Cl.
*H04W 76/10* (2018.01)
*H04B 17/336* (2015.01)
*G06F 9/48* (2006.01)
*H04W 24/08* (2009.01)
*H04W 88/08* (2009.01)
*H04W 84/10* (2009.01)

(52) U.S. Cl.
CPC ........... *H04W 24/02* (2013.01); *H04W 24/08* (2013.01); *H04W 76/10* (2018.02); *H04W 84/10* (2013.01); *H04W 88/08* (2013.01)

(58) Field of Classification Search
CPC ..... H04W 36/14; H04W 48/16; H04W 16/14; H04W 36/0083; H04W 36/08; H04W 36/30; H04W 48/20; H04W 4/44; H04W 76/27; H04W 88/085; H04W 24/04; H04W 48/18; H04W 72/0453; H04W 72/14; H04W 76/50; H04W 84/045; H04W 92/02; H04W 92/20; H04W 16/26; H04W 28/021; H04W 36/0022; H04W 40/02; H04W 48/10; H04W 4/02; H04W 4/023; H04W 4/50; H04W 56/001; H04W 74/0808; H04W 76/25; H04W 24/00; H04W 28/18; H04W 28/26; H04W 36/0016; H04W 36/0069; H04W 36/00835; H04W 36/0094; H04W 40/22; H04W 40/246; H04W 40/248; H04W 48/04; H04W 4/00; H04W 56/00; H04W 56/002; H04W 60/00; H04W 72/02; H04W 72/0406; H04W 72/0426; H04W 72/0446; H04W 72/046; H04W 72/087; H04W 72/10; H04W 72/1236; H04W 72/1257; H04W 76/11; H04W 76/12; H04W 76/20; H04W 76/28; H04W 84/047; H04W 84/105; H04W 92/16; H04W 24/08; G06F 9/4881; H04B 17/336; H04L 67/12; H04L 5/001; H04L 5/00; H04L 67/10; H04L 5/0053; H04L 1/0026; H04L 1/1812; H04L 1/08; H04L 2209/80

See application file for complete search history.

(56) References Cited

U.S. PATENT DOCUMENTS

| | | | |
|---|---|---|---|
| 9,113,352 B2 | 8/2015 | Agarwal et al. | |
| 9,332,413 B2 | 5/2016 | Schuette et al. | |
| 9,391,592 B2 | 7/2016 | Leyh et al. | |
| 9,554,307 B2* | 1/2017 | Chen | H04W 16/02 |
| 9,826,415 B1* | 11/2017 | Byrne | H04W 16/26 |
| 2016/0198389 A1* | 7/2016 | Cao | H04W 76/10 |
| | | | 370/315 |

* cited by examiner

DYNAMIC MANAGEMENT OF INCIDENT AREA DEPLOYABLE COMMUNICATIONS SYSTEMS

BACKGROUND OF THE INVENTION

Organizations such as public safety agencies may need to deploy their own communication networks (for example, incident area networks) at incident locations to address poor coverage, capacity, or security requirements. The incident area networks are deployed using portable base stations. Some incidents may involve large or multiple areas that may not be adequately covered by a single base station.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
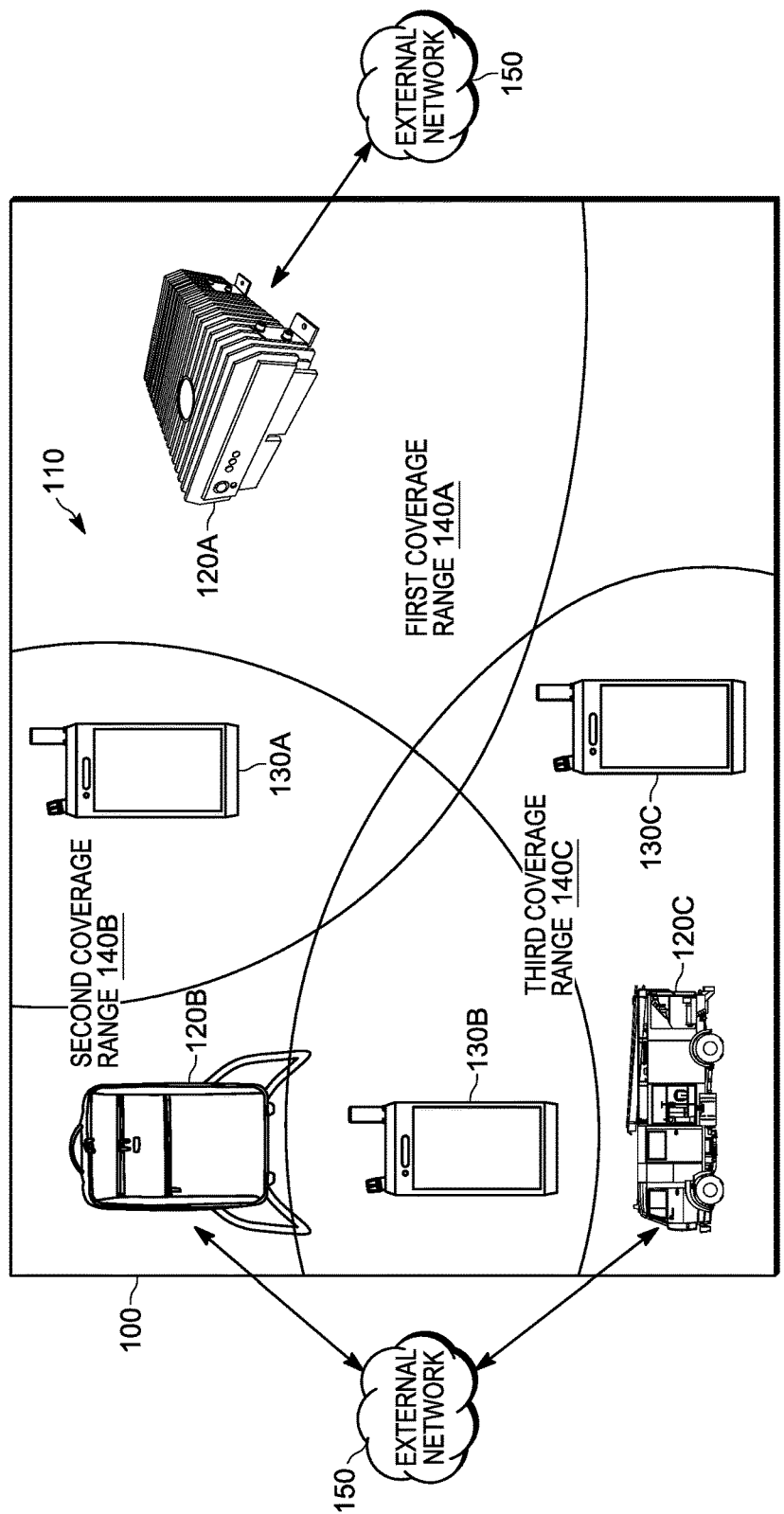
FIG. 1 illustrates an incident area including a system for dynamic management of incident area deployable communications systems in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In situations where a single base station may not be sufficient to cover an incident area, public safety agencies may deploy multiple portable base stations to provide coverage to their subscribers. While deploying multiple portable base stations addresses deficiencies in coverage or capacity, the multiple base stations may negatively interfere with each other when deployed close to each other. Additionally, the deployable base stations may move within or in and out of the incident area. Such movement may result in degraded or lost wireless communication coverage in certain parts of the incident area. At least one solution to the above identified problems includes dynamic management of incident area deployable communication systems.

One embodiment provides a deployable base station for providing wireless communication coverage at an incident area. The deployable base station includes a transceiver including a sidehaul interface to communicate with one or more deployable base stations and an air interface for providing wireless communication coverage to one or more mobile communication devices at the incident area. The deployable base station also includes an electronic processor coupled to the transceiver. The electronic processor is configured to establish a connection over the sidehaul interface with at least one other deployable base station of the one or more deployable base stations and send, via the transceiver over the sidehaul interface to the at least one other deployable base station, first incident scene information pertaining to the deployable base station. The electronic processor is also configured to receive, via the transceiver over the sidehaul interface from the at least one other deployable base station, second incident scene information pertaining to the at least one other deployable base station and determine a coverage region for providing wireless communication coverage to the one or more mobile communication devices based on requirements of the incident area. The electronic processor is further configured to determine whether to activate or deactivate the air interface based on the coverage region, the first incident scene information, and the second incident scene information and to activate the air interface in response to determining to activate the air interface.

Another embodiment provides a method for providing wireless communication coverage at an incident area, the incident area including one or more deployable base stations. The method includes establishing, with a transceiver of a first deployable base station over a sidehaul interface of the transceiver, a connection with at least one other deployable base station of the one or more deployable base stations and sending, via the transceiver over the sidehaul interface to the at least one other deployable base station, first incident scene information pertaining to the first deployable base station. The method further includes receiving, via the transceiver over the sidehaul interface from the at least one other deployable base station, second incident scene information pertaining to the at least one other deployable base station and determining, using an electronic processor of the first deployable base station, a coverage region for providing wireless communication coverage to a one or more mobile communication devices based on requirements of the incident area. The method also includes determining, using the electronic processor, whether to activate an air interface of the transceiver based on the coverage region, the first incident scene information, and the second incident scene information and activating, using the electronic processor, the air interface of the transceiver in response to determining to activate the air interface, the air interface providing wireless communication coverage to the one or more mobile communication devices at the incident area.

Another embodiment provides a deployable base station for providing wireless communication coverage at an incident area. The deployable base station includes a transceiver including a sidehaul interface to communicate with one or more deployable base stations and an air interface for providing wireless communication coverage to one or more mobile communication devices at the incident area. The deployable base station also includes an electronic processor coupled to the transceiver. The electronic processor is configured to establish a connection over the sidehaul interface with at least one other deployable base station of the one or more deployable base stations and receive, via the transceiver over the sidehaul interface from the at least one other deployable base station, first incident scene information pertaining to the at least one other deployable base station. The electronic processor is also configured to determine a coverage region for providing wireless communication coverage to the one or more mobile communication devices based on requirements of the incident area and determine whether to activate or deactivate at least one other air interface of the at least one other deployable base station based on the coverage region, the first incident scene information and a second incident scene information, the second incident scene information pertaining to the deployable base station. The electronic processor is further configured to send, via the transceiver over the sidehaul interface, activation information to the at least one other deployable base station, wherein the at least one other deployable base station activates the at least one other air interface in response to receiving the activation information.

Another embodiment provides a method for providing wireless communication coverage at an incident area, the incident area including one or more deployable base stations. The method includes establishing, with a transceiver of a first deployable base station over a sidehaul interface of the transceiver, a connection with at least one other deployable base station of the one or more deployable base stations and receiving, via the transceiver over the sidehaul interface from the at least one other deployable base station, first incident scene information pertaining to the at least one other deployable base station. The method also includes determining, using an electronic processor of the first deployable base station, a coverage region for providing wireless communication coverage to one or more mobile communication devices based on requirements of the incident area and determining, using the electronic processor, whether to activate or deactivate at least one other air interface of the at least one other deployable base station based on the coverage region, the first incident scene information and a second incident scene information, the second incident scene information pertaining to the first deployable base station. The method further includes sending, via the transceiver over the sidehaul interface, activation information to the at least one other deployable base station, wherein the at least one other deployable base station activates the at least one other air interface in response to receiving the activation information.

FIG. 1 illustrates an incident area 100 including a system 110 for dynamic management of incident area deployable communications systems. FIG. 1 illustrates only one exemplary embodiment of the system 110. The system 110 may include more or fewer components and may perform functions other than those explicitly described herein.

In the example illustrated, the system 110 includes a deployable base station 120A (a stand-alone device and base station), a deployable base station 120B (a backpack-fitted device and base station), and deployable base station 120C (a vehicle-mounted device and base station). Another suitable deployable base station 120 is a base station mounted in an unmanned aerial vehicle or drone. The deployable base stations 120A, 120B, and 120C are, in some instances, singularly referred to as the deployable base station 120. In some instances, the deployable base stations 120A, 120B, and 120C are collectively referred to as the deployable base stations 120. More generically, the three deployable base stations 120 are sometimes referred to as a first deployable base station 120A, a second deployable base station 120B, and a third deployable base station 120C. The deployable base stations 120 provide wireless communication coverage to mobile communication devices 130A, 130B, and 130C (in some instances, singularly referred to as the mobile communication device 130 and, in some instances, collectively referred to as the mobile communication devices 130). The mobile communication devices 130 may also be referred to as subscriber devices and User Equipment (UE).

Each of the deployable base stations 120 is, for example, a Node B, an Evolved Node B (eNodeB), a microsite or a similar transceiver station or telecommunications node. In one example, the deployable base station 120 is a long term evolution (LTE) eNodeB. The first base station 120A provides wireless communication coverage to mobile communication devices 130 that are within a first coverage range 140A of the first base station 120A. The second base station 120B provides wireless communication coverage to mobile communication devices 130 that are within a second coverage range 140B of the second base station 120B. Similarly, the third base station 120C provides wireless communication coverage to mobile communication devices 130 that are within a third coverage range 140C of the third base station 120C.

The deployable base stations 120 are connected to one or more external networks 150 through backhaul management devices (not shown in FIG. 1). In one example, the backhaul management devices include a core network (for example, an evolved packet core (EPC) function) and a backhaul management entity. In some embodiments, rather than being connected to the external networks 150 through backhaul management devices, one or more of the deployable base stations 120 are connected to the external networks 150 through another deployable base station 120 (for example, in a mesh network). In one example, the first base station 120A is connected to the external networks 150 through the third base station 120C and the backhaul management devices associated with the third base station 120C. In some embodiments, each deployable base station 120 includes a core network that interoperates with other core networks across the other deployable base stations 120 at the incident area 100.

In addition to being connected to the external networks 150, the deployable base stations 120 also communicate with each other over a backhaul network or a sidehaul network. In the backhaul network, the deployable base stations 120 communicate with each other through the backhaul management devices and the external networks 150. In the sidehaul network, the deployable base stations 120 may communicate over out-of-band radio frequency (RF) connections to form, for example, a sidehaul mesh network at the incident area 100. The out-of-band RF connections reduce interference with the network coverage provided by the deployable base stations 120. In other embodiments, the deployable base stations 120 communicate over in-band RF connections, which may share frequency or time resources with the wireless communication coverage provided by the deployable base stations 120 at the incident area 100. In some embodiments, the deployable base stations 120 communicate with each other over a combination of backhaul and sidehaul networks. The communicative connection between the deployable base stations 120 may be referred to as a sidehaul connection regardless of whether the deployable base stations 120 are connected over the backhaul network or over the sidehaul network.

The sidehaul network may be a meshing, point-to-multipoint, or point-to-point link, including a satellite link, a wide area network link, a local area network link, a microwave link, a millimeter wave link, or the like. The sidehaul connection may also include a narrowband data link, such as a Project 25 (P25), a Digital Mobile Radio (DMR) data link, a terrestrial trunked radio (TETRA) link, or the like. Additionally, the sidehaul connection may further include a LTE link, Wi-Fi™ link, Bluetooth® link, 802.11ah, 802.15.4(g) link, or the like.

The mobile communication devices 130 may be, for example, two-way radios, smart telephones, tablet computers, laptop computers, vehicle-mounted radios, drone-mounted radios, modems, relays, and the like. In one example, the mobile communication devices 130 may be LTE User Equipment (UE) devices. The mobile communication devices 130 communicate with each other via messages sent and received to and from the deployable base stations 120. In certain instances, the mobile communication devices 130 also receive application services. The application services may be provided from application servers located in the external networks 150 via communications that occur through the deployable base stations 120. In some embodiments, some or all the application services reside on a local server along with other network devices that are directly connected to the deployable base station 120. For example, a push-to-talk (voice over internet protocol (VOIP)) or video server resides alongside a core network connected to the deployable base station 120.

Networks that are suitable for use as one or more of the external networks 150 include, private networks and carrier networks. Suitable networks include a global system for mobile communication (GSM) network, a high speed packet access (HSPA) network, a code-division multiple access (CDMA) network, a long-term evolution (LTE) network, a long-term evolution advanced (LTE-A) network, a microwave network, a millimeter wave network a Project "25" network, a terrestrial trunked radio (TETRA) network, a satellite network, and the like.

Figure 2:
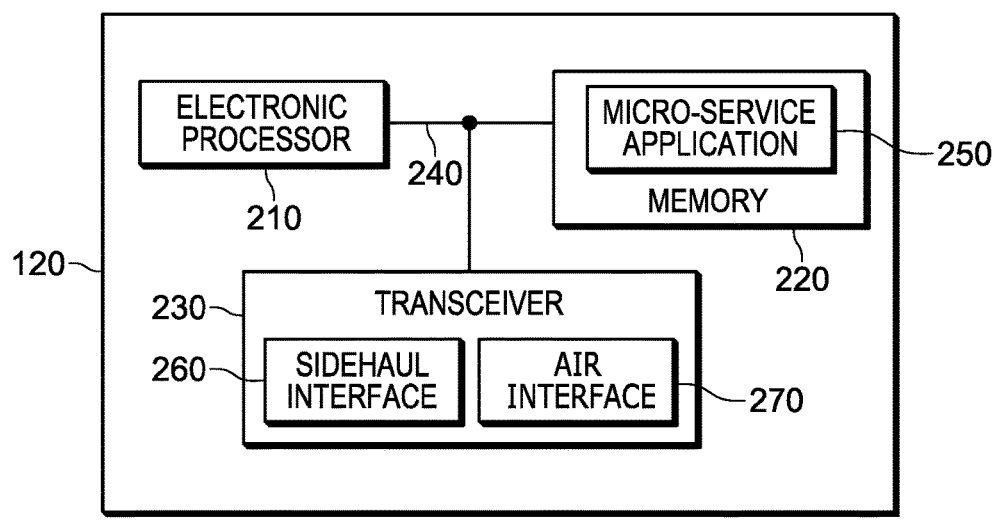
FIG. 2 is a block diagram of a deployable base station in accordance with some embodiments.

FIG. 2 illustrates components of the deployable base station 120. In the example illustrated, the deployable base station 120 includes an electronic processor 210, a memory 220, and a transceiver 230. The electronic processor 210, the memory 220, and the transceiver 230 communicate over one or more control and/or data buses (for example, communication bus 240).

In some embodiments, the electronic processor 210 is implemented as a microprocessor with separate memory, such as the memory 215. In other embodiments, the electronic processor 210 is implemented as a microcontroller or digital signal processor (with memory 220 on the same chip). In other embodiments, the electronic processor 210 is implemented using multiple processors. In addition, the electronic processor 210 may be implemented partially or entirely as, for example, a field-programmable gate array (FPGA), and application specific integrated circuit (ASIC), and the like and the memory 220 may not be needed or be modified accordingly. In the example illustrated, the memory 220 includes non-transitory, computer-readable memory that stores instructions that are received and executed by the electronic processor 210 to carry out functionality of the deployable base station 120 described herein. For example, the memory includes a micro-service application 250 that is executed by the electronic processor 210 to carry out certain functionality of the deployable base station 120. The memory 220 may include, for example, a program storage area and a data storage area. The program storage area and the data storage area may include combinations of different types of memory, such as read-only memory and random-access memory.

The transceiver 230 enables wired or wireless communication between the deployable base station 120 and the external networks 150, between the deployable base station 120 and the mobile communication devices 130, and among the deployable base stations 120. In some embodiments, rather than a transceiver 230, the deployable base station 120 includes separate transmitting and receiving components, for example, a transmitter and a receiver. In addition, the deployable base station 120 can include separate transceiver interfaces, one each for providing wireless communication coverage at the incident area 100, backhaul network communication, and sidehaul network communication. For example, in one instance the transceiver 230 includes a sidehaul interface 260 that allows the deployable base station 120 to communicate with other deployable base stations 120 at the incident area 100 over a sidehaul connection. The transceiver 230 also includes an air interface 270 (for example, LTE Uu air interface) for providing wireless air interface communication coverage to the one or more mobile communication devices 130 at the incident area 100.

Referring back to FIG. 1, the first base station 120A, the second base station 120B, and the third base station 120C typically operate on the same or nearby carrier frequencies to provide wireless communication coverage to the mobile communication devices 130. Operating on the same or nearby carrier frequencies introduces interference (for example, a co-channel or adjacent channel interference) in the wireless communication coverage provided at the incident area 100. Additionally, when the deployable base stations 120 are operating within a wide area network on the same or nearby frequencies, additional interference is introduced in the wireless communication coverage provided at the incident area 100. As a consequence, the deployable base stations 120 need to be dynamically managed to provide appropriate coverage to the one or more mobile communication devices 130 in the incident area 100. The effects of the interferences introduced as described above may be modeled by a micro-service application and are useful in determining which deployable base stations 120 to activate and in determining transmission characteristics of the activated deployable base stations 120. In at least one example, each deployable base station 120 is activated or deactivated based on certain criteria as described below. In addition, the transmission characteristics of activated deployable base stations 120 are determined and set or adjusted to reduce interference. In at least one embodiment, these decisions are made centrally at, for example, a main deployable base station 120 or at a controller (not shown) connected to the deployable base stations 120 through the external networks 150. In other embodiments, these decisions are among several deployable base stations 120 present at the incident area 100.

Figure 3:
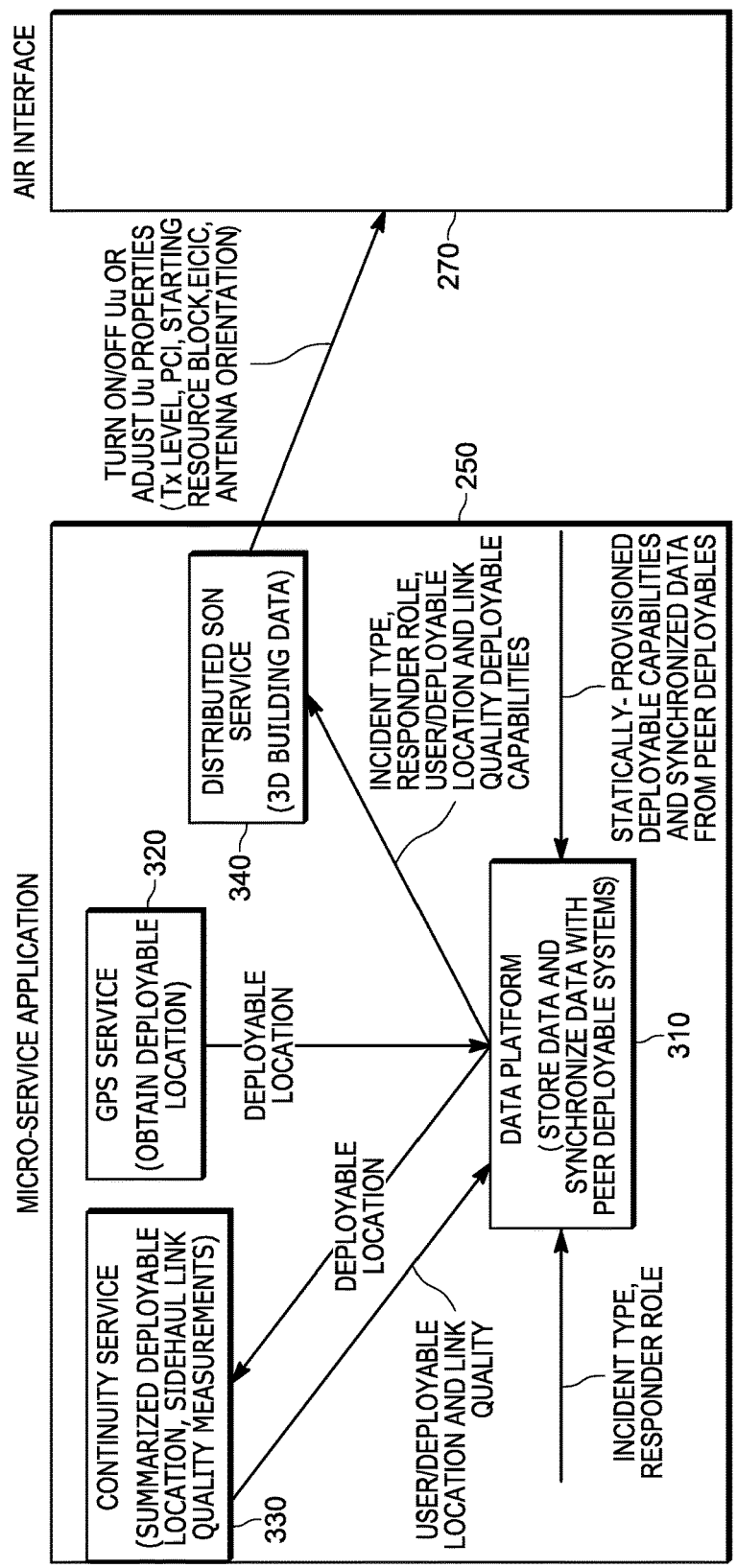
FIG. 3 is a block diagram of a micro-service application executed by the deployable base station of FIG. 2.

FIG. 3 illustrates a micro-service application 250 that is executed by each of the deployable base stations 120 to exchange information. The micro-service application 250 is used to make decisions on whether to activate each of the air interfaces 270 of the deployable base stations 120. The micro-service application 250 also determines the transmission characteristics to use when activating the air interfaces 270. In the example illustrated, the micro-service application 250 includes a data platform 310, a global positioning system (GPS) service 320, a continuity service 330, and a self-organizing networks (SON) service 340. The data platform 310 stores and synchronizes data with the other deployable base stations 120 at the incident area 100. The data platform 310 receives information regarding the incident area 100 from, for example, a call controller of a public safety dispatch center. The incident information includes, for example, a type of incident (for example, incident type) the deployable base stations 120 are serving at the incident area 100 (for example, a high-rise fire, a special weapons and tactics (SWAT) operation, and the like), a role and availability status of each responder (for example, fire fighter, fire chief, patrol officer, police chief, weapons specialist, lead negotiator, etc.) assigned to the incident area 100, a location of each responder's mobile communication device 130 (if available), and the like. The data platform 310 also receives the provisioned deployable unit capabilities (for example, maximum transmitter power level, antenna gain, antenna height, and the like) of other deployable base stations 120 at incident area 100 through a sidehaul connection. In other embodiments, deployable base station 120 capabilities are stored or cached locally and referenced by a deployable base station 120 identifier. The data platform 310 also receives synchronized data from the other deployable base stations 120 through the sidehaul connection. The synchronized data may include the data received from the GPS service 320, the continuity service 330 and the SON service 340 as described below.

The GPS service 320 obtains coordinates or GPS information, referred to as a deployable location, of the deployable base station 120 through, for example, a GPS receiver. The GPS service 320 provides the deployable location to the data platform 310. The continuity service 330 receives the deployable location of the deployable base station 120 and deployable locations of the other deployable base stations 120 from the data platform 310. The continuity service 330 summarizes the deployable locations of the deployable base stations 120 at the incident area 100 and determines a quality of sidehaul connections between the deployable base stations 120 at the incident area 100. The continuity service 330 provides the summarized deployable locations and the sidehaul connection quality to the data platform 310. The continuity service 330 continuously summarizes the deployable locations and the sidehaul connections quality. Movement of a deployable base station 120 causes a change in the deployable location of the deployable base station 120. The continuity service 330 tracks the movements of the deployable base stations 120 at the incident area 100 and updates the deployable locations and sidehaul connection quality.

The SON service 340 receives information about the incident type, the responder role, deployable locations, sidehaul connection quality, and deployable capabilities of the deployable base stations 120 at incident area 100 from the data platform 310. Additionally, the SON service 340 also receives information regarding the incident area 100, for example, a contour of the incident area 100, two- or three-dimensional building information, land clutter information (for example, foliage), Wide Area Network (WAN) system information, and the like. Based on the above information received, the SON service 340 determines whether to activate and with what transmission characteristics to activate the air interface 270 of the deployable base station 120 (as illustrated in FIG. 4).

Figure 4:
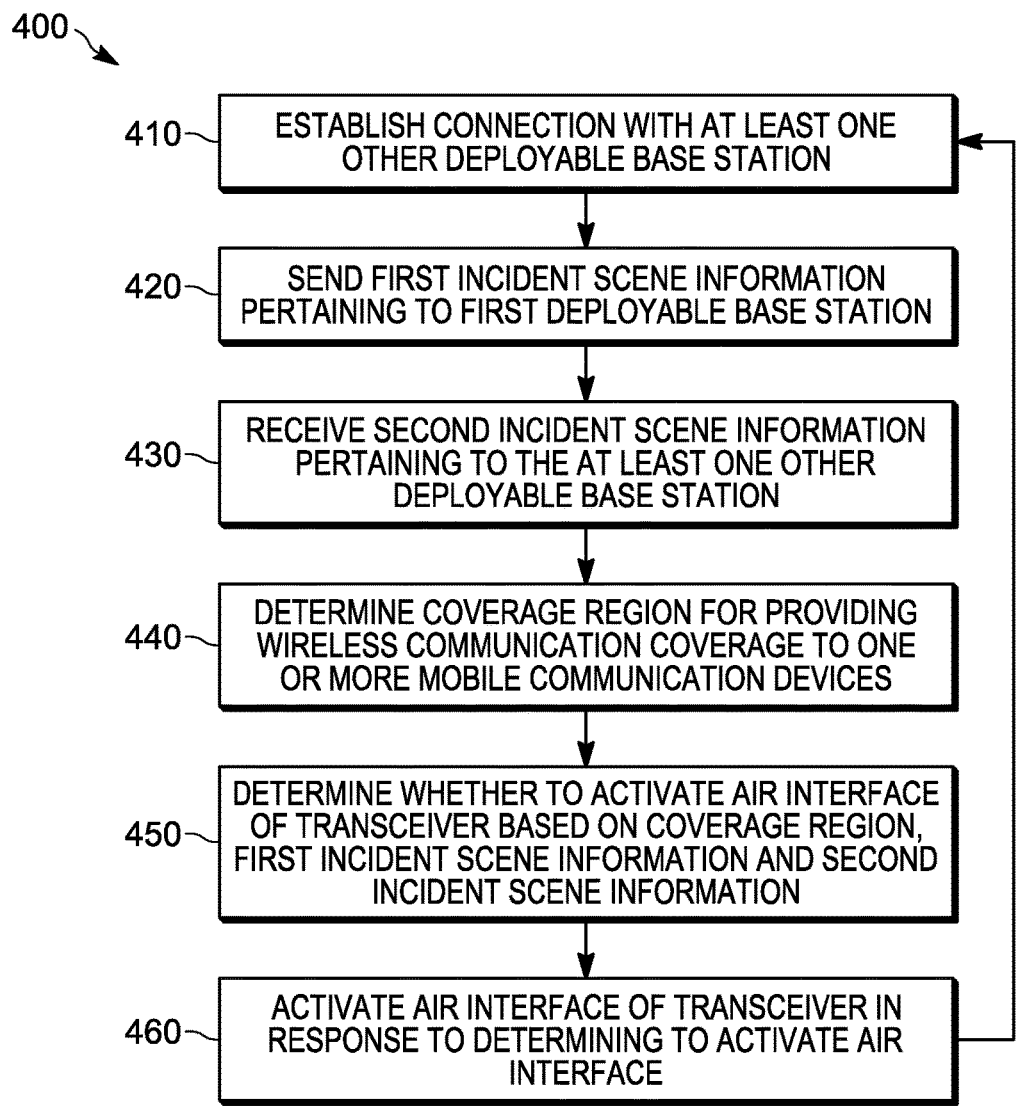
FIG. 4 is a flowchart of a method for dynamic management of incident area deployable communications systems in accordance with some embodiments.

FIG. 4 illustrates a flowchart of an example method 400 for an ad hoc peer-to-peer mode implemented dynamic management of incident area deployable communications systems. In the peer-to-peer mode implemented method 400, the activation-deactivation decision making is decentralized such that each deployable base station 120 performs the steps described below based on information received from other deployable base stations 120. The method 400 may be performed by the SON service 340 of the micro-service application 250 that is executed by the electronic processor 210. The method 400 includes establishing, with the transceiver 230 of the first deployable base station 120A over the sidehaul interface 260 of the transceiver 230, a connection with at least one other deployable base station 120 (at block 410) of the one or more deployable base stations 120. The first deployable base station 120A establishes a sidehaul connection with the second deployable base station 120B, and the third deployable base station 120C through the sidehaul interface 260. The sidehaul connection between the deployable base stations 120 allows the deployable base stations 120 to provide incident scene information to each other.

Incident scene information includes base station information and incident attributes. Base station information that is exchanged as part of the incident scene information may include information about maximum transmit power level, antenna pattern, antenna height, antenna orientation, deployable transmitter/receiver Multiple-Input Multiple-Output (MIMO) capability, out-of-band emissions (OOBE) performance level, deployable unit class, deployable unit capability, a reference identifier and the like. The base station information may also include deployable base station location, base station battery status, assigned task of the medium (for example, backpack or vehicle) carrying the base station 120, role of the responder carrying the base station 120 (that is, the backpack carrier, the vehicle driver, and the like), an amount of time base station 120 is expected to remain at the incident area 100, assigned tasks of the responder or vehicle carrying the base station 120, tasks and status (for example, battery status) of the vehicle in which the base station 120 resides, and the like. Incident attributes may include a type of incident being served, a list of mobile communication devices 130 at the incident area 100, and incident roles that should be prioritized for coverage. Incident attributes may also include profile of applications required for the type of incident. For example, a hazardous materials (HAZMAT) fire may require each prioritized mobile communication device 130 to support downlink bandwidth of at least 3.4. Mbps, comprised of push-to-talk audio, thermal video, and peer responder telemetry. In another example, a SWAT team may require a downlink bandwidth of 10 Mbps and an uplink bandwidth of 1 Mbps. The application profile can be expressed in terms of bandwidth, packet loss, and/or packet latency/jitter. Other communication transport measures, such as a guaranteed bit rate channel, a best effort channel, or the like, may also be specified.

The method 400 also includes sending, via the transceiver 230 over the sidehaul interface 260 to the at least one other deployable base station 120, first incident scene information pertaining to the first deployable base station 120A (at block 420). In a preferred embodiment, the first incident scene information is continuously updated between the deployable base stations 120. The method 400 also includes receiving, via the transceiver 230 over the sidehaul interface 260 from the at least one other deployable base station 120, second incident scene information pertaining to the at least one other deployable base station 120 (at block 430). For example, the first base station 120A receives the second incident scene information from the second base station 120B and the third base station 120C at the incident area 100.

An incident coverage area may also be defined. In the specific example, the method 400 includes determining, using the electronic processor 210 of the first deployable base station 120A, a coverage region for providing wireless communication coverage to one or more mobile communication devices 130 based on requirements of the incident area 100 (at block 440). As described above, the first deployable base station 120A may receive information regarding the incident area 100, such as the incident type, the incident address, the location of the responders' mobile communication devices 130, and the like. Based on this information, the SON service 340 determines the requirements of the incident area 100. For example, a house fire type incident may define an incident coverage area to be a 200 meter (m) radius circle or polygon centered on the incident address, while a bank robbery may define an incident coverage area to be a 5000 m radius circle or polygon containing an incident address. Note that other shapes or sizes of coverage areas are possible without any loss of generality of the described methods. Alternatively, the coverage region may be generated to encompass all deployable base stations 120 within a certain distance of each other, or within sidehaul communication range of each other (to accommodate moving vehicles or incident areas). In some embodiments, only vehicles with a velocity below a certain threshold may be considered as available for deployable base station 120 activation (for example, a first responder deployable units that stop at a particular incident scene). Based on the above information, the SON service 340 may determine optimized communications air interface coverage of the incident area 100.

The SON service 340 defines the coverage region based on the requirements of the incident area 100. In some embodiments, the coverage region is defined by a different entity (for example, a command center). In these embodiments, the SON service 340 receives the coverage region from the command center or other authority. The coverage region is the region in the incident area 100 where the wireless communication coverage may be provided to the mobile communication devices 130. For example, for a particular mission, a 1200 kbps downlink channel and a 200 kbps uplink channel may be required for mobile communication devices 130 within the incident area 100. These throughput levels may change based on the mission type, responder role, or other information, and are generally tracked and coverage is adapted in an incident area air interface modeling.

After a coverage area is determined, an air interface 270 may be activated. The method 400 includes determining, using the electronic processor 210, to activate the air interface 270 of the transceiver 230 based on the coverage region, the first incident scene information, and the second incident scene information (at block 450). The SON service 340 determines whether to activate or deactivate the air interface 270 of the first base station 120A based on the coverage region, the first incident scene information, and the second incident scene information such that negative self-interference effects in the coverage region are reduced.

The SON service 340 implements an incident area air interface modeling to determine activation/deactivation states of the deployable base stations 120 and/or determines deployable base station 120 transmission characteristics. A method 700 for the incident area air interface modeling is described below with respect to FIG. 7. As a consequence, the deployable base stations 120 provide effective or suitable wireless communication coverage to the mobile communication devices 130 at the incident area 100. Effective or suitable wireless communication coverage include, for example, coverage in the incident area 100 over a predetermined received signal power threshold, received signal to interference ratio threshold, data throughput threshold, or other criteria as set by the public safety entity managing the deployable base stations 120.

Optionally, the method 400 also includes determining, using the electronic processor 210, transmission characteristics to be provided over the air interface 270 based on the coverage region, the first incident scene information, and the second incident scene information and in response to determining to activate the air interface 270. In addition to determining to activate the air interface 270 of the first base station 120A, the SON service 340 also determines the transmission characteristics with which to activate the air interface 270 such that negative interference in the coverage region is reduced and such that effective wireless communication coverage is provided to the one or more mobile communication devices 130 at the incident area 100. The transmission characteristics include, for example, a transmission power level, antenna orientation/direction, antenna gain, inter cell interference coordination setting (ICIC), physical cell identifier (PCI), Multiple-Input Multiple-Output (MIMO) configuration, neighbor relations table, number of resource blocks to be used in transmission, and the like.

The method 400 further includes activating, using the electronic processor 210, the air interface 270 of the transceiver 230 in response to determining to activate the air interface 270 (at block 460). The air interface 270 provides wireless communication coverage to the one or more mobile communication devices 130 at the incident area 100. In some embodiments, the method 400 includes activating the air interface 270 in accordance with the determined transmission characteristics. For example, in some instances, the SON service 340 provides an activation signal to the air interface 270 and sets the transmission characteristics of the air interface 270 after they have been determined.

In some embodiments, the deployable base stations 120 or other management entities (for example, an incident commander, a dispatch center, a communications coordinator, or the like) also identify prioritized areas of coverage. Prioritized areas of coverage, or critical incident areas, are regions where providing wireless communication may be critical, and wireless communication coverage is provided with higher throughput or reliability, or where wireless communication coverage is otherwise prioritized. The SON service 340 may identify prioritized areas of coverage based on one or more of an incident type, an incident address, a responder mission type, a role of each responder assigned to the incident area 100, a location of a command post, a location of a vehicle, aircraft, drone, or other similar machine, and a location of each responder's mobile communication device 130. For example, prioritized areas of coverage may track groups of first responders (e.g., a SWAT team), suspects, stationary (e.g., particular buildings) or mobile (e.g., vehicles, drones, etc.) areas. These areas may require even higher signal to interference plus noise ratios or data throughputs than other locations within an overall incident coverage region.

Figure 5:
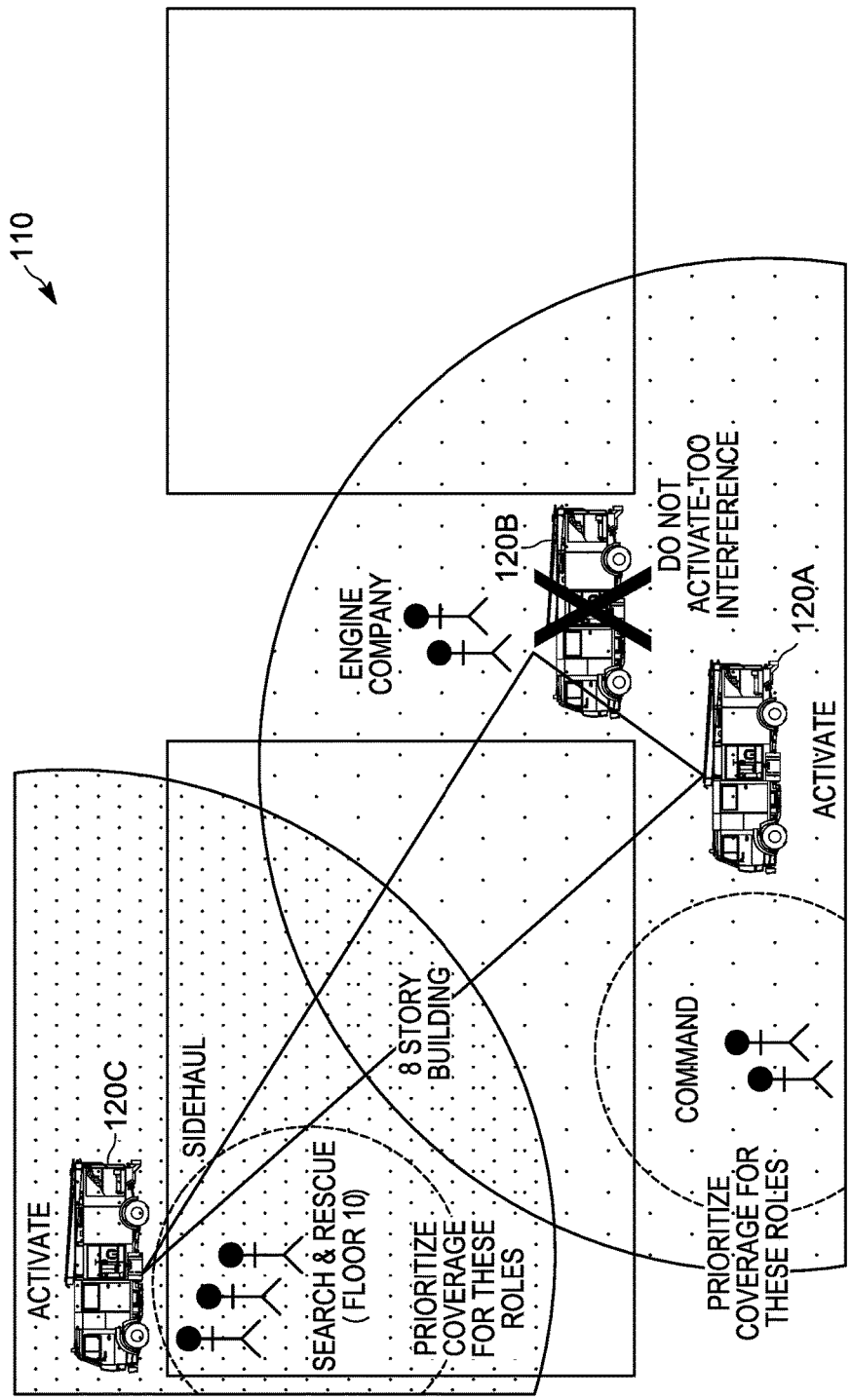
FIG. 5 illustrates an example incident area including prioritized areas of coverage in accordance with some embodiments.

FIG. 5 illustrates an example incident area 100 including prioritized areas of coverage. The SON service 340 identifies that the command center and the search and rescue location are prioritized areas of coverage where providing wireless communication coverage may be critical. Additionally, the SON service 340 identifies that the location of the engine company is not a prioritized area of coverage. Defining the coverage region, determining whether to activate or deactivate the air interface 270, and determining the transmission characteristics are also based on the prioritized areas of coverage. In the example illustrated in FIG. 5, the coverage region is defined to include the two prioritized areas of coverage and the location of the engine company. The first base station 120A activates and the second base station 120B deactivates based on the prioritized areas of coverage and the defined coverage region to avoid negative interference. The first base station 120A and the third base station 120C also determine their transmission characteristics to provide effective coverage at the prioritized areas of coverage (for example, by maximizing data throughput over these areas).

Figure 6:
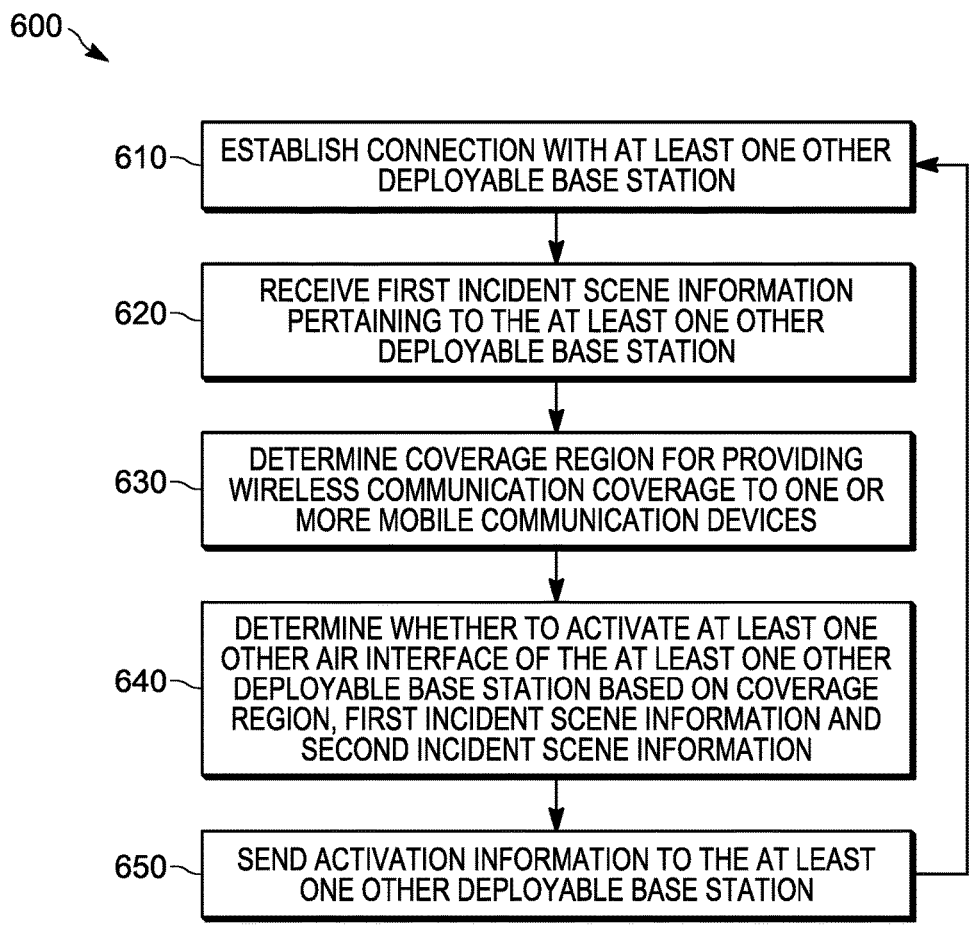
FIG. 6 is a flowchart of a method for dynamic management of incident area deployable communications systems in accordance with some embodiments.

FIG. 6 illustrates a flowchart of an example method 600 for master-slave-mode-implemented, dynamic management of incident area deployable communications systems. In the master-slave-mode-implemented method 600, the activation-deactivation decision making is centralized such that a master deployable base station 120 (for example, the first deployable base station 120A) performs the steps described below based on information received from other deployable base stations 120. In some embodiments, the method 600 may also be implemented in a centralized command center or in a cloud processing resource.

The method 600 may be performed by the SON service 340 of the micro-service application 250 that is executed by the electronic processor 210. The method 600 includes establishing, with the transceiver 230 of the first deployable base station 120A over the sidehaul interface 260 of the transceiver 230, a connection with at least one other deployable base station 120 (at block 610) of the one or more deployable base stations 120. The first deployable base station 120A establishes a sidehaul connection with the second deployable base station 120B, and the third deployable base station 120C through the sidehaul interface 260. The sidehaul connection between the deployable base stations 120 allows the one or more deployable base stations 120 to provide incident scene information to the first deployable base station 120A.

The method 600 also includes receiving, via the transceiver 230 over the sidehaul interface 260 from the at least one other deployable base station 120, first incident scene information pertaining to the at least one other deployable base station 120 (at block 620). For example, the first base station 120A receives the first incident scene information from the second base station 120B and the third base station 120C at the incident area 100.

Once the incident scene information is received, a coverage area is defined. In the specific example, the method 600 includes determining, using the electronic processor 210 of the first deployable base station 120A, a coverage region for providing wireless communication coverage to one or more mobile communication devices 130 based on requirements of the incident area 100 (at block 440). As described above, the first deployable base station 120A may receive information regarding the incident area 100, such as the incident type, the incident address, the location of the responders' mobile communication devices 130, and the like. Based on this information, the SON service 340 determines the requirements of the incident area 100. The SON service 340 defines the coverage region based on the requirements of the incident area 100 as described above.

After a coverage area is determined, the first deployable base station 120A may determine which of the one or more deployable base stations 120 may be activated. The method 600 includes determining, using the electronic processor 210, whether to activate at least one other air interface 270 of the at least one other deployable base station 120 based on the coverage region, the first incident scene information, and a second incident scene information (at block 640). The second incident scene information pertains to the first deployable base station 120A. For example, the SON service 340 determines whether to activate or deactivate the air interface 270 of the second base station 120B based on the coverage region, the first incident scene information received, and the second incident scene information such that negative self-interference effects in the coverage region are reduced. The SON service 340 implements an incident area air interface modeling to determine activation state and/or transmission characteristics (and a method for the incident area air interface modeling is described below with respect to FIG. 7). As a consequence, the deployable base stations 120 provide effective or suitable wireless communication coverage to the mobile communication devices 130 at the incident area 100.

In some embodiments, the method 600 also optionally includes determining, using the electronic processor 210, transmission characteristics to be provided over the at least one other air interface 270 based on the coverage region, the first incident scene information, and the second incident scene information and in response to determining to activate the at least one other air interface 270. In addition to determining to activate the at least on other air interface 270 of the second base station 120B, the SON service 340 also determines the transmission characteristics with which to activate the at least one other air interface 270 such that negative interference in the coverage region is reduced and such that effective wireless communication coverage is provided to the one or more mobile communication devices 130 at the incident area 100.

The method 600 further includes sending, via the transceiver 230 over the sidehaul interface 260, activation information including the determined transmission characteristics to the at least one other deployable base station 120 (at block 650). The activation information may include the determined transmission characteristics. The SON service 340 provides an activation signal to the second base station 120B and sets the transmission characteristics of the air interface 270 of the second base station 120B if the transmission characteristics are determined. The second deployable base station 120B (that is, the at least one other deployable base station 120) activates the air interface 270 of the second deployable base station 120 (that is, the at least one other air interface 270) in accordance with the determined transmission characteristics in response to receiving the activation information.

Figure 7:
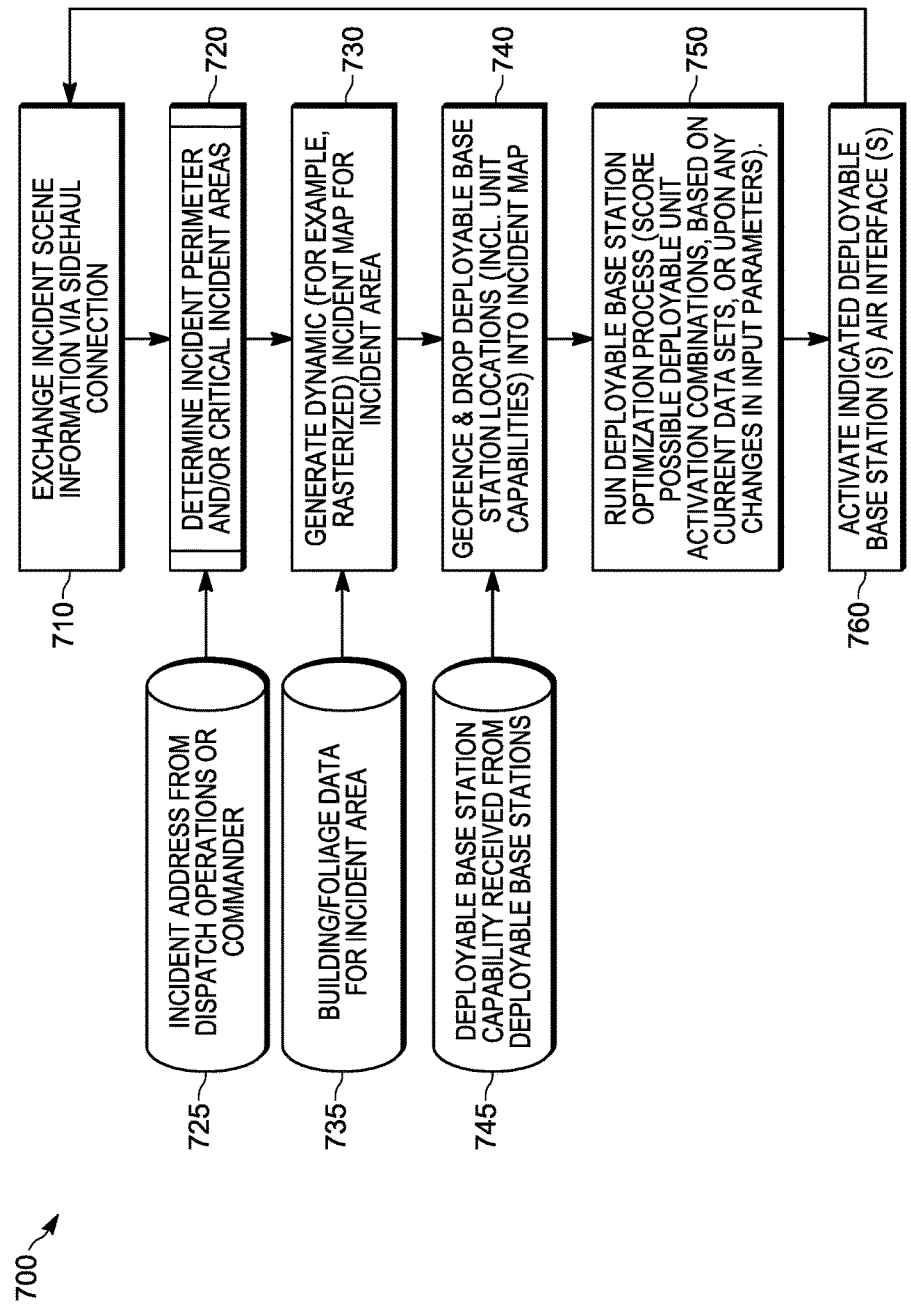
FIG. 7 is a flowchart of a method for dynamic management of incident area deployable communications systems in accordance with some embodiments.

As noted, FIG. 7 illustrates a flowchart of an example method 700 for the incident area air interface modeling. The method 700 is described as being performed by the deployable base station 120 below. However, it will be appreciated that the method 700 may be performed by a centralized controller at for example, a dispatch center, a command center, or the like. The method 700 includes exchanging incident scene information via the sidehaul connection (at block 710). In the peer-to-peer mode, the incident scene information is exchanged between all the deployable base stations 120 at the incident area 100. In the master-slave mode, the incident scene information from all deployable base stations 120 is provided to the master deployable base station 120. The method 700 also includes determining incident perimeter and/or critical incident areas (at block 720). Optionally, the electronic processor 210 determines the incident perimeter based on the incident address received from dispatch operations or a commander of the incident area 100 (at block 725). The critical incident areas or prioritized areas of coverage may be determined as described above.

The method 700 also includes generating, using the electronic processor 210, a dynamic (for example, rasterized) incident map for the incident area 100 (at block 730). For example, the incident area 100 is examined on a regular grid (for example, of 5 meters (m)). The dynamic map may be generated based on building outline and/or clutter (foliage) data for the incident area 100 received from a command center or stored in the memory 220. In the peer-to-peer mode, all deployable base stations 120 generate the dynamic incident map. In the master-slave mode, only the master deployable base station 120 generates the dynamic incident map.

The method 700 also includes geofencing and dropping, using the electronic processor 210, deployable base station 120 locations into the incident map (at block 740). The location information received from each deployable base station 120 is used to drop the deployable base station 120 locations into the incident map. Additionally, the incident map may be generated such that the capabilities of the deployable base stations 120 are taken into account (at block 745).

The method 700 includes running, using the electronic processor 210, a deployable base station optimization process (at block 750). The deployable base station optimization process takes into account one or more deployable base station 120 locations, deployable base stations 120 capabilities, building outline data, land clutter (for example, foliage) information, or the like to simulate air interface performance over the entire incident area 100, and optionally locations of prioritized responders (and their associated mobile communication devices 130) requiring air interface coverage. For example, the coverage region may be examined on a regular grid (for example, of 5 m), where the signal to interference plus noise ratio (SINR), received signal strength information (RSSI), and achievable air interface throughput are typically computed for each possible (hypothetical) mobile communication device 130 user location (for example, on each 5 m point) in the overall incident area grid. The overall RSSI, SINR and throughput information (or metrics) can be computed for the overall incident area 100 for each possible combination of deployable base station 120 activations (for example, having only the first base station 120A activated at a particular transmit power level, having only the second base station 120B activated at a particular transmit power level, having both base stations 120A and 120B activated at particular power levels, having three base stations 120 activated at particular power levels, and the like), and each activation combination can be scored in terms of the overall achieved throughput or SINR levels, based on the above computations. These computations may take into account capabilities and/or characteristics of deployable base stations 120 (for example, transmit power levels, antenna heights, antenna patterns, and the like). Note that reference symbol received power (RSRP) levels may be substituted for RSSI levels in the above computations for LTE systems.

In some instances, all possible combinations of deployable base station 120 activations are scored (for example, all single deployable base station 120 activations, all double deployable base station 120 activations, all triple deployable base station 120 activations, and the like). Self-interference effects (e.g., interference from the other deployable base station 120 transmitting on the same channel) are taken into account in the modeling, and Wide Area Network (WAN) interference effects may also be taken into account. WAN transmitter characteristics, such as location, transmit power level, antenna height, Physical Cell Identifier (PCI), inter cell interference coordination (ICIC), and the like may be taken into account in the air interface modelling when computing overall RSSI, SINR, or throughput levels. Interference reduction techniques, such as ICIC techniques (in LTE) may be utilized to reduce the interference among users by sub-dividing frequency resources (known as resource blocks in LTE) over at least a portion of the cell area. The scoring technique may ultimately activate the combination of deployable base stations 120 with the configuration that achieves the highest overall throughput or SINR levels (or the highest scored combination). SINR or throughput levels may be computed and weighted for both the downlink and uplink in the air interface system. The WAN system coverage metrics (e.g., RSSI, SINR or throughput levels) may also be utilized in the scoring technique to see if the WAN system provides better coverage than the deployable base stations 120.

In addition, in the prioritized areas of coverage, the desired coverage levels (e.g., RSSI, SINR or throughput) are even higher than in the rest of the incident area 100. These areas are weighted even higher in the scoring technique described above, such that the chosen deployable base station 120 activation combination provides optimized coverage levels to the specified prioritized areas of coverage. For example, prioritized areas of coverage are assigned a first weight while the rest of the coverage region is assigned a second weight. The first weight is higher than the second weight. The electronic processor 210 evaluates the overall SINR metric over the coverage region for one or more activation combinations of the one or more deployable base stations 120 based on the first weight and the second weight.

The deployable base station optimization process may utilize various radio signal propagation models or a combination of those models, including the Hata, 3GPP (for example, WINNER), ITU P.1411, ITM, or Longley-Rice models (including terrain effects) to model RSSI, RSRP, SINR, or throughput levels within the incident area 100. As discussed above, land clutter databases may also be utilized to model local foliage or other radio clutter effects. In addition, the use of building outline data is desirable to incorporate into the propagation modeling for the air interface 270. Building outline data may include internal walls, windows, corridors, material composition, etc. in addition to external walls (building outlines). Generally, the higher the resolution of the building and clutter data, the more accurate the incident area coverage and throughput modeling. Each incident area 100 will generally have unique and specific building and clutter data. Clutter losses may be modeled based on material type (for example, X decibels per meter (dB/m) of loss through a particular type of foliage or material), and building penetration losses may also be modeled based on the wall type (for example, 10 decibels (dB) of loss through an external wall, 5 dB of loss through a window, 3 dB of loss through an internal wall, and the like). In addition, indoor propagation losses may be modeled as a wave guide (for example, Y dB/m of loss down an internal hallway). By using high resolution building outline data and clutter data, the radio air interface 270 performance may be accurately modeled and predicted. The high resolution building outline and clutter databases may be compressed and reside in the memory 215, or alternatively may reside in a central location (e.g., at the dispatch center, in a cloud computing resource, etc.).

The deployable base station optimization process (and the scoring technique) is executed periodically based on changes to the coverage region, the incident scene information, and/or other parameters as described below. The method 700 also includes activating the deployable base stations' air interfaces 270 in accordance with the determined transmission characteristics (at block 760). In the peer-to-peer mode, each deployable base station 120 locally makes the determination whether to activate or deactivate and the transmission characteristics with which to activate. In the master-slave mode, the master deployable base station 120A sends the activation information including the transmission characteristics to each of the one or more deployable base stations 120. The slave deployable base stations 120 activate or deactivate the air interfaces 270 based on the activation information received from the master deployable base station 120.

In the scoring technique described above, the RF modeling simulation may be run with an arbitrary number of power levels for each deployable base station 120, and the coverage levels (e.g., RSSI, SINR, or throughput levels) scored for each possible configuration, with the selected configuration being the one that results in the highest coverage levels. In general, the deployable base stations 120 with the highest level of receiver sensitivity, MIMO capabilities, transmit power levels, antenna heights, etc. are likely to be activated at an incident area 100, provided they are not located too closely to one another (which would cause undue self-interference in a single frequency network). In a similar manner, the SON service 340 may assign PCI or ICIC parameters to minimize interference among deployable base stations 120, and potentially the WAN system. For example, if three deployable base stations 120 are activated in a single frequency LTE network, each deployable base station 120 may be assigned ⅓ of the uplink frequencies for assignment to minimize interference on the wireless air interface uplink between deployable base stations 120. Similarly, almost blank subframes (ABS) may be utilized on the WAN downlink to reduce interference with the deployable base stations 120. Some level of timing synchronization may be required among the WAN and deployable systems in these cases.

In some embodiments, a location is identified as a prioritized area of coverage based on an input received from a responder on a mobile communication device 130 or at a command console. For example, when the SON service 340 determines that an emergency button on a first mobile communication device 130 from the one or more mobile communication devices 130 is activated, the SON service 340 identifies the location of the first mobile communication device 130 as a prioritized area of coverage.

In some conditions, the deployable base station 120 determines that none of the other deployable base stations 120 are able to provide wireless communication coverage for the prioritized areas of coverage. For example, in the case illustrated in FIG. 5, the third base station 120C determines that none of the other deployable base stations 120A and 120B are able to provide wireless communication coverage at the search and rescue location. This determination is based on the incident scene information received from the first base station 120A and the second base station 120B. For example, the first base station 120A and the second base station 120B may at locations that are physically too far from the search and rescue location to fall within a transmission or reception range. The third base station 120C determines whether to activate the air interface 270 in response to determining that none of the other of the one or more deployable base stations 120 can provide wireless communication coverage for the prioritized areas of coverage. In addition, the third base station 120C determines second transmission characteristics to provide wireless communication coverage for the prioritized areas of coverage; and activates the air interface 270 with second transmission characteristics.

In some embodiments, even when two or more deployable base stations 120 can provide wireless communication coverage to the prioritized areas of coverage, one of the deployable base stations 120 may not have adequate transmission characteristics to provide sufficient coverage at the prioritized areas of coverage. When these conditions occur, the SON service 340 determines which one or more of the deployable base stations 120 can provide wireless communication coverage for the prioritized areas of coverage. The SON service 340 determines that the transmission characteristics of the deployable base station 120 are not sufficient to provide coverage to the prioritized areas of coverage. The SON service 340 deactivates the air interface 270 in response to determining that the transmission characteristics of the deployable base station 120 are not sufficient to provide coverage to the prioritized areas of coverage.

When two or more deployable base stations 120 can provide wireless communication coverage at the prioritized areas of coverage and the two or more deployable base stations 120 include sufficient transmission characteristics to provide effective coverage at the prioritized areas of coverage, the incident scene may be based on the best overall signal-to-noise ratio plus interference (SINR) metric in the coverage region. In these embodiments, the SON service 340 determines that the at least one other deployable base station 120 can also provide wireless communication coverage for the prioritized areas of coverage and determines that the transmission characteristics of the deployable base station 120 are sufficient to provide coverage to the prioritized areas of coverage. The SON service 340 determines a first signal-to-noise ratio plus interference at the prioritized areas of coverage based on the transmission characteristics and a second signal-to-noise ratio plus interference (SINR) at the prioritized areas of coverage based on a second transmission characteristics received from the at least one other deployable base station 120. The SON service 340 activates the air interface 270 when the first SINR is greater than the second SINR and deactivates the air interface 270 when the second SINR is greater than the first SINR.

The deployable base stations 120 exchange incident scene information (in some cases, continuously or periodically) to dynamically manage activations decision of the deployable base stations 120. This provides wireless coverage in the incident area 100 even when the deployable base stations 120 move within or in and out of the incident area 100, or the incident coverage region or prioritized areas of coverage are changed. The SON service 340 determines that the at least one other deployable base station 120 is moved to a first location. The SON service 340 determines that the at least one other deployable base station 120 can provide wireless communication coverage for the prioritized areas of coverage based on the at least one other deployable base station 120 moving to the first location. In these embodiments, as described above, the SON service 340 determines a first overall signal-to-noise ratio plus interference (SINR) metric at the prioritized areas of coverage based on the transmission characteristics and a second overall signal-to-noise ratio plus interference (SINR) metric at the prioritized areas of coverage based on a third transmission characteristics received from the at least one other deployable base station 120. The SON service 340 activates the air interface 270 when the first overall SINR metric is greater than the second overall SINR metric, and deactivates the air interface 270 when the second overall SINR metric is greater than the first overall SINR metric.

In some embodiments, the incident scene depends on a schedule or incident queue of a medium carrying the deployable base station 120. For example, a public safety vehicle carrying a deployable base station 120 may have a work queue that requires the vehicle to leave the incident area 100 earlier than the other deployable base stations 120. In these embodiments, the deployable base station 120 may not be activated. The incident scene information may further also take into account work queues of the deployable base stations 120. The SON service 340 may identify a first number of tasks on a first work queue associated with the deployable base station 120 based on the first incident scene information. For example, the SON service 340 identifies the number of tasks for the first base station 120A. The SON service 340 also identifies a second number of tasks on a second work queue associated with the at least one other deployable base station 120 based on the second incident scene information. For example, SON service 340 identifies the number of tasks for the second base station 120B based on incident scene information received from the second base station 120B. The SON service 340 determines whether the first number of tasks is smaller than the second number of tasks. The SON service 340 activates the air interface 270 in response to determining that the first number of tasks is smaller than the second number of tasks.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A deployable base station for providing wireless communication coverage at an incident area, the deployable base station comprising:
    a transceiver including a sidehaul interface to communicate with one or more deployable base stations and an air interface for providing wireless communication coverage to one or more mobile communication devices at the incident area;

an electronic processor coupled to the transceiver and configured to
- establish a connection over the sidehaul interface with at least one other deployable base station of the one or more deployable base stations,
- send, via the transceiver over the sidehaul interface to the at least one other deployable base station, first incident scene information pertaining to the deployable base station,
- receive, via the transceiver over the sidehaul interface from the at least one other deployable base station, second incident scene information pertaining to the at least one other deployable base station,
- determine a coverage region for providing wireless communication coverage to the one or more mobile communication devices based on requirements of the incident area,
- determine whether to activate or deactivate the air interface based on the coverage region, the first incident scene information, and the second incident scene information, and
- activate the air interface in response to determining to activate the air interface.

2. The deployable base station of claim 1, wherein the electronic processor is further configured to
- determine transmission characteristics to be provided over the air interface based on the coverage region, the first incident scene information, and the second incident scene information and in response to determining to activate the air interface, wherein the air interface is activated in accordance with the determined transmission characteristics.

3. The deployable base station of claim 2, wherein the electronic processor is further configured to
- identify prioritized areas of coverage based on at least one selected from a group consisting of an incident type, a role of each responder assigned to the incident area, and a location of each responder's mobile communication device, wherein determining the coverage region, determining whether to activate or deactivate the air interface, and determining the transmission characteristics are further based on the prioritized areas of coverage.

4. The deployable base station of claim 2, wherein the transmission characteristics include at least one selected from a group consisting of a transmission power level, an antenna orientation, an antenna gain, an inter cell interference coordination setting, a physical cell identifier, a Multiple-Input Multiple-Output (MIMO) configuration, a neighbor relations table, and a number of resource blocks to be used in transmission, and wherein the electronic processor is further configured to determine the requirements of the incident area based on at least one selected from a group consisting of an incident type, a responder status, a responder role, and a location of each responder's mobile communication device.

5. The deployable base station of claim 2, wherein the electronic processor is further configured to
- determine that an emergency button on a first mobile communication device from the one or more mobile communication devices is activated, and
- identify a location of the first mobile communication device as a prioritized area of coverage, wherein defining the coverage region, determining whether to activate or deactivate the air interface, and determining the transmission characteristics are further based on the prioritized area of coverage.

6. The deployable base station of claim 1, wherein the electronic processor is further configured to
- identify a first number of tasks on a first work queue associated with the deployable base station based on the first incident scene information,
- identify a second number of tasks on a second work queue associated with the at least one other deployable base station based on the second incident scene information,
- determine that the first number of tasks is smaller than the second number of tasks, and
- activate the air interface in response to determining that the first number of tasks is smaller than the second number of tasks.

7. A method for providing wireless communication coverage at an incident area, the incident area including one or more deployable base stations, the method comprising:
- establishing, with a transceiver of a first deployable base station over a sidehaul interface of the transceiver, a connection with at least one other deployable base station of the one or more deployable base stations;
- sending, via the transceiver over the sidehaul interface to the at least one other deployable base station, first incident scene information pertaining to the first deployable base station;
- receiving, via the transceiver over the sidehaul interface from the at least one other deployable base station, second incident scene information pertaining to the at least one other deployable base station;
- determining, using an electronic processor of the first deployable base station, a coverage region for providing wireless communication coverage to a one or more mobile communication devices based on requirements of the incident area;
- determining, using the electronic processor, whether to activate an air interface of the transceiver based on the coverage region, the first incident scene information, and the second incident scene information;
- activating, using the electronic processor, the air interface of the transceiver in response to determining to activate the air interface, the air interface providing wireless communication coverage to the one or more mobile communication devices at the incident area.

8. The method of claim 7, further comprising:
- determining, using the electronic processor, transmission characteristics to be provided over the air interface based on the coverage region, the first incident scene information, and the second incident scene information and in response to determining to activate the air interface, the air interface is activated in accordance with the determined transmission characteristics.

9. The method of claim 8, further comprising:
- identifying prioritized areas of coverage based on at least one selected from a group consisting of an incident type, a role of each responder assigned to the incident area, and a location of each responder's mobile communication device, wherein determining the coverage region, determining whether to activate or deactivate the air interface, and determining the transmission characteristics are further based on the prioritized areas of coverage.

10. The method of claim 8, wherein the transmission characteristics include at least one selected from a group consisting of a transmission power level, an antenna orientation, an antenna gain, an inter cell interference coordination setting, a physical cell identifier, a Multiple-Input Multiple-Output (MIMO) configuration, a neighbor relations table and a number of resource blocks to be used in transmission, the method further comprising:
determining the requirements of the incident area based on at least one selected from a group consisting of an incident type, a responder status, a responder role, and a location of each responder's mobile communication device.

11. The method of claim 8, further comprising:
determining that an emergency button on a first mobile communication device from the one or more mobile communication devices is activated; and
identifying a location of the first mobile communication device as a prioritized area of coverage, wherein defining the coverage region, determining whether to activate or deactivate the air interface, and determining the transmission characteristics are further based on the prioritized area of coverage.

12. The method of claim 8, further comprising:
identifying a first number of tasks on a first work queue associated with the first deployable base station based on the first incident scene information;
identifying a second number of tasks on a second work queue associated with the at least one other deployable base station based on the second incident scene information; and
determining that the first number of tasks is smaller than the second number of tasks; and
activating the air interface in response to determining that the first number of tasks is smaller than the second number of tasks.

13. A deployable base station for providing wireless communication coverage at an incident area, the deployable base station comprising:
a transceiver including a sidehaul interface to communicate with one or more deployable base stations and an air interface for providing wireless communication coverage to one or more mobile communication devices at the incident area;
an electronic processor coupled to the transceiver and configured to
establish a connection over the sidehaul interface with at least one other deployable base station of the one or more deployable base stations,
receive, via the transceiver over the sidehaul interface from the at least one other deployable base station, first incident scene information pertaining to the at least one other deployable base station,
determine a coverage region for providing wireless communication coverage to the one or more mobile communication devices based on requirements of the incident area,
determine whether to activate or deactivate at least one other air interface of the at least one other deployable base station based on the coverage region, the first incident scene information and a second incident scene information, the second incident scene information pertaining to the deployable base station, and
send, via the transceiver over the sidehaul interface, activation information to the at least one other deployable base station, wherein the at least one other deployable base station activates the at least one other air interface in response to receiving the activation information.

14. The deployable base station of claim 13, wherein the electronic processor is further configured to:
determine transmission characteristics to be provided over the at least one other air interface based on the coverage region, the first incident scene information and the second incident scene information and in response to determining to activate the at least one other air interface, wherein the activation information sent to the at least one other deployable base station includes the determined transmission characteristics and wherein the at least one other deployable base station activates the at least one other air interface in accordance with the determined transmission characteristics in response to receiving the activation information.

15. The deployable base station of claim 13, wherein the electronic processor is further configured to
evaluate an overall signal to interference plus noise ratio (SINR) metric over the coverage region for one or more activation combinations of the one or more deployable base stations when determining whether to activate or deactivate the at least one other air interface of the at least one other deployable base station.

16. The deployable base station of claim 14, wherein the electronic processor is further configured to
identify prioritized areas of coverage based on at least one selected from a group consisting of an incident type, a role of each responder assigned to the incident area, and a location of each responder's mobile communication device, wherein determining the coverage region, determining whether to activate or deactivate the at least one other air interface of the at least one other deployable base station, and determining the transmission characteristics are further based on the prioritized areas of coverage;
assign a first weight to the prioritized areas of coverage and a second weight to rest of the coverage region, wherein the first weight is higher than the second weight; and
evaluate an overall signal to interference plus noise ratio (SINR) metric over the coverage region for one or more activation combinations of the one or more deployable base stations when determining whether to activate or deactivate the at least one other air interface of the at least one other deployable base station,
wherein evaluating the overall signal to interference plus noise ratio metric is based on the first weight and the second weight.

17. A method for providing wireless communication coverage at an incident area, the incident area including one or more deployable base stations, the method comprising:
establishing, with a transceiver of a first deployable base station over a sidehaul interface of the transceiver, a connection with at least one other deployable base station of the one or more deployable base stations;
receiving, via the transceiver over the sidehaul interface from the at least one other deployable base station, first incident scene information pertaining to the at least one other deployable base station,
determining, using an electronic processor of the first deployable base station, a coverage region for providing wireless communication coverage to one or more mobile communication devices based on requirements of the incident area,
determining, using the electronic processor, whether to activate or deactivate at least one other air interface of the at least one other deployable base station based on the coverage region, the first incident scene information and a second incident scene information, the second incident scene information pertaining to the first deployable base station, and sending, via the transceiver over the sidehaul interface, activation information to the at least one other deployable base station, wherein the at least one other deployable base station activates the at least one other air interface in response to receiving the activation information.

18. The method of claim 17, further comprising:

determining, using the electronic processor, transmission characteristics to be provided over the at least on other air interface based on the coverage region, the first incident scene information and the second incident scene information and in response to determining to activate the at least one other air interface, wherein the activation information sent to the at least one other deployable base station includes the determined transmission characteristics and wherein the at least one other deployable base station activates the at least one other air interface in accordance with the determined transmission characteristics in response to receiving the activation information.

19. The method of claim 18, wherein the electronic processor is further configured to identifying prioritized areas of coverage based on at least one selected from a group consisting of an incident type, a role of each responder assigned to the incident area, and a location of each responder's mobile communication device, wherein determining the coverage region, determining whether to activate or deactivate the at least one other air interface of the at least one other deployable base station, and determining the transmission characteristics are further based on the prioritized areas of coverage;

assigning a first weight to the prioritized areas of coverage and a second weight to rest of the coverage region, wherein the first weight is higher than the second weight; and evaluate, using the electronic processor, an overall signal to interference plus noise ratio (SINR) metric over the coverage region for one or more activation combinations of the one or more deployable base stations when determining whether to activate or deactivate the at least one other air interface of the at least one other deployable base station, wherein evaluating the overall signal to interference plus noise ratio metric is based on the first weight and the second weight.

20. The method of claim 17, wherein determining whether to activate or deactivate the at least one other air interface of the at least one other deployable base station further comprises:

evaluating, using the electronic processor, an overall signal to interference plus noise ratio (SINR) metric over the coverage region for one or more activation combinations of the one or more deployable base stations.

* * * * *